United States Patent [19]

Deutsch

[11] Patent Number: 4,526,081

[45] Date of Patent: Jul. 2, 1985

[54] EXTENDED HARMONICS IN A POLYPHONIC TONE SYNTHESIZER

[75] Inventor: Ralph Deutsch, Sherman Oaks, Calif.

[73] Assignee: Kawai Musical Instrument Mfg. Co., Ltd., Hamamatsu, Japan

[21] Appl. No.: 631,419

[22] Filed: Jul. 16, 1984

[51] Int. Cl.[3] .............................................. G01H 1/06

[52] U.S. Cl. ...................................... 84/1.23; 84/1.01

[58] Field of Search ...................... 84/1.19, 1.21, 1.22, 84/1.23, 1.01

[56] References Cited

U.S. PATENT DOCUMENTS 4,179,972 12/1979 Hiyoshi et al. ...................... 84/1.19

4,342,248 8/1982 Deutsch et al. ...................... 84/1.19

*Primary Examiner*—Forester W. Isen

*Attorney, Agent, or Firm*—Ralph Deutsch

[57] ABSTRACT

A keyboard operated musical instrument is disclosed in which a musical tone having an extended range of harmonics is produced by combining two waveshapes. The first waveshape has a spectrum containing only the odd-numbered harmonics and the second waveshape spectrum has all the harmonics and is phase locked to the first waveshape. The second waveshape has a fundamental frequency which is twice the fundamental frequency of the first waveshape.

9 Claims, 3 Drawing Figures

EXTENDED HARMONICS IN A POLYPHONIC TONE SYNTHESIZER

BACKGROUND OF THE INVENTION

1. Field of the Invention

This invention relates to electronic musical tone synthesis and in particular is concerned with tones having an extended number of harmonics.

2. Description of the Prior Art

A relatively large number of harmonics are required for an electronic tone synthesizer which imitates certain types of musical tones. These sounds include brass, strings, and reed families of tone. While the maximum harmonic capability of tone generation for almost any musical tone generator usually can be extended by adding to the number and size of the system elements, such a straightforward harmonic capability extension may not be economically feasible for a low cost musical instrument design. Increasing the maximum number of harmonics in a digital tone generation system may easily encounter a speed limitation imposed by the maximum clock speed at which the digital logic circuitry can be operated.

In U.S. Pat. No. 3,809,709 entitled "Implementation Of Combined Footage Stops In A Computor Organ" a method is disclosed for producing an approximation to a combination of tones at different fundamental frequencies during a single tone calculation algorithm which computes waveshape amplitudes by evaluating a discrete Fourier transform of a stored set of harmonic coefficients. The first tone is computed using an incomplete set of harmonics and a second tone, at lower pitch, is computed by using the first harmonic and some selected low order odd harmonics.

The present invention provides a novel implementation for extending the maximum harmonic capability of a digital musical tone generator.

SUMMARY OF THE INVENTION

In a Polyphonic Tone Synthesizer of the type described in U.S. Pat. No. 4,085,644 a computation cycle and a data transfer cycle are repetitively and independently implemented to provide data which are converted into musical waveshapes. A sequence of computation cycles is implemented during each of which two master data sets are generated. A master data set comprises a set of data points which define a period of a musical waveshape.

The first master data is computed using a set of stored harmonic coefficients whose non-zero values correspond to the odd-numbered harmonics of a musical tone. The second master data set is computed using a set of stored harmonics which correspond to the even-numbered harmonics of a musical tone. After the two master data sets are computed, a transfer cycle is initiated during which the first master data set is transferred to a plurality of note registers and the second master data set is transferred to a corresponding plurality of extended note registers. There is a note register and an extended note register associated with each tone generator.

The data stored in a note register is read out sequentially and repetitively by a note clock such that the memory advance rate corresponds to a fixed multiple of the fundamental musical frequency associated with an actuated keyboard switch. The data stored in an extended note register is read out sequentially and repetitively by a timing clock phase-locked to the note clock and such that the memory advance rate is two times that of the memory advance rate used for reading data from the note register.

The data read out of the note register and the extended note register are combined and converted into an analog musical waveshape which has an extended harmonic range equal to the sum of two sets of harmonic coefficients.

BRIEF DESCRIPTION OF THE DRAWINGS

The detailed description of the invention is made with reference to the accompanying drawings wherein like numerals designate like components in the figures.

DETAILED DESCRIPTION OF THE INVENTION

The present invention is directed toward a polyphonic musical tone generation system wherein waveshapes having an extended number of harmonics are created by the addition of waveshapes. The extended harmonic tone generation system is incorporated into a musical instrument of the type which synthesizes musical waveshapes by implementing a discrete Fourier transform algorithm. A tone generation system of this category is described in U.S. Pat. No. 4,085,644 entitled "Polyphonic Tone Synthesizer." This patent is hereby incorporated by reference. In the following description all elements of the system which are described in the referenced patent are identified by two digit numbers which correspond to the same numbered elements appearing in the referenced patent.

Figure 1:
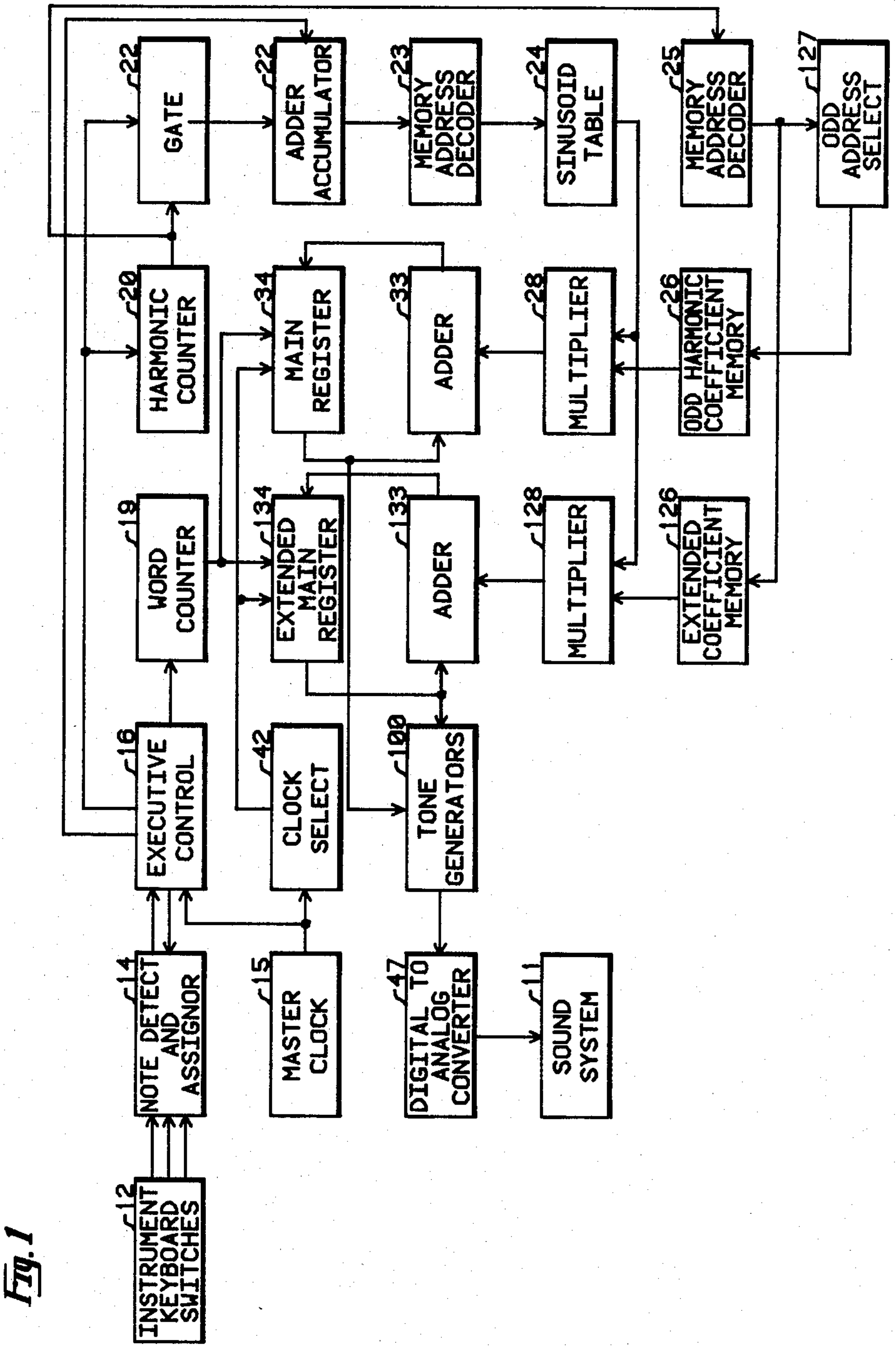
FIG. 1 is a schematic diagram of an embodiment of the invention.

FIG. 1 shows an embodiment of the present invention which is described as a modification and adjunct to the system described in the referenced patent U.S. Pat. No. 4,085,644. As described in the referenced patent, the Polyphonic Toner Synthesizer includes an array of instrument keyboard switches 12. If one or more of the keyboard switches has a switch status change and is actuated ("on" switch position), the note detect and assignor 14 encodes the detected keyboard switch having the status change to an actuated state and stores the corresponding note information for the actuated keyswitches. A tone generator, contained in the block labeled tone generators 100, is assigned to each actuated keyswitch using information generated by the note detect and assignor 14.

A suitable configuration for a note detect and assignor subsystem is described in U.S. Pat. No. 4,022,098. This patent is hereby incorporated by reference.

When one or more keyswitches have been actuated, the executive control 16 initiates a repetitive sequence of computation cycles. During each computation cycle, two master data sets are computed. The 64 data words in a master data set correspond to the amplitudes of 64 equally spaced points of one cycle of a waveform for a musical tone. The general rule is that the maximum number of harmonics in the audio tone spectra is no more than one-half of the number of data points in one complete waveshape period. Therefore, a master data set comprising 64 data words corresponds to a musical waveshape having a maximum of 32 harmonics.

As described in the referenced U.S. Pat. No. 4,085,644 it is desirable to be able to continuously recompute and store the master data sets during a repetitive sequence of computation cycles and to load this data into note registers while the actuated keyswitches remain actuated, or depressed, on the keyboards. There are two note registers associated with each tone generator contained in the system block labeled tone generators 100.

In the manner described in the referenced U.S. Pat. No. 4,085,644 the harmonic counter 20 is initialized to its minimal, or zero, count state at the start of each computation cycle. Each time that the word counter 19 is incremented by the executive control 16 so that it returns to its minimal, or zero, count state because of its modulo counting implementation, a signal is generated by the executive control 16 which increments the count state of the harmonic counter 20. The word counter 19 is implemented to count modulo 64 which is the number of data words comprising each of the two master data sets. The harmonic counter 20 is implemented to count modulo 32. This number corresponds to the maximum number of harmonics consistent with a master data set comprising 64 data words.

At the start of each computation cycle, the accumulator in the adder-accumulator 21 is initialized to a zero value by the executive control 16. Each time that the word counter is incremented, the adder-accumulator 21 adds the current count state of the harmonic counter 20 to the sum contained in the accumulator. This addition is implemented to be modulo 64.

The content of the accumulator in the adder-accumulator 21 is used by the memory address decoder 23 to access trigonometric sinusoid values from the sinusoid table 24. The sinusoid table 24 is advantageously implemented as a read only memory storing values of the trigonometric function sin $(2\pi\phi/64)$ for $0 \leqq \phi \leqq 64$ at intervals of D. D is a table resolution constant.

The memory address decoder 25 is used to read out harmonic coefficients stored in the odd harmonic coefficient memory 26 and the extended coefficient memory 126 in response to the count state of the harmonic counter 20.

The extended harmonic coefficients are stored in the extended coefficient memory. These comprise a set of 32 harmonic coefficient data values. A set of 16 harmonic coefficient values are stored in the odd harmonic coefficient memory. These correspond to the first 16 odd-numbered harmonics in the generated musical tone. The 32 harmonic coefficients stored in the extended coefficient memory 126 correspond to the even harmonics 2, 4, . . . , 64 in the generated musical tone.

The odd address select 127 reads out a harmonic coefficient from the odd harmonic coefficient memory 26 in response to the output of the memory address decoder if the address corresponds to an odd-numbered address. If the address corresponds to an even numbered address, a zero value is provided to the multiplier 28. The odd address select 127 decides that the address is odd-numbered if the least significant bit is a "0" value. The memory address is implemented so that the first address corresponds to the binary number 00000.

The multiplier 28 generates the product value of the trigonometric data value read out from the sinusoid table 24 and the value of the harmonic coefficient read out from the odd harmonic coefficient memory 26. The generated product value formed by the multiplier 28 is furnished as one input to the adder 33.

The contents of the main register 34 and the extended main register 134 are initialized to a zero value at the start of each computation cycle. Each time that the word counter 19 is incremented, the content of the main register 34, at an address corresponding to the count state of the word counter 19, is read out and furnished as an input to the adder 33. The sum of the inputs to the adder 33 are stored in the main register 34 at a memory location equal, or corresponding, to the count state of the word counter 19. After the word counter 19 has been cycled for 32 complete cycles of 64 counts, the main register 34 will contain a master data set which comprises a complete period of a musical waveshape having a spectral function comprising only odd-numbered non-zero spectral values determined by the harmonic coefficients stored in the odd harmonic coefficient memory 26.

The multiplier 128 generates the product value of the trigonometric data value read out from the sinusoid table 24 and the value of the harmonic coefficient read out from the extended harmonic coefficient memory 126. The generated product value formed by the multiplier 128 is furnished as one input to the adder 133.

Each time that the word counter 19 is incremented, the content of the extended main register 134, at an address corresponding to the count state of the word counter 19, is read out and furnished as an input to the adder 133. The sum of the inputs to the adder 133 are stored in the extended main register 134 at a memory location equal, or corresponding, to the count state of the word counter 19. After the word counter 19 has been cycled for 32 complete cycles of 64 counts, the extended main register 134 will contain an extended master data set which comprises a complete period of a musical waveshape having a spectral function corresponding to the 32 harmonic coefficients stored in the extended coefficient memory 126.

Figure 2:
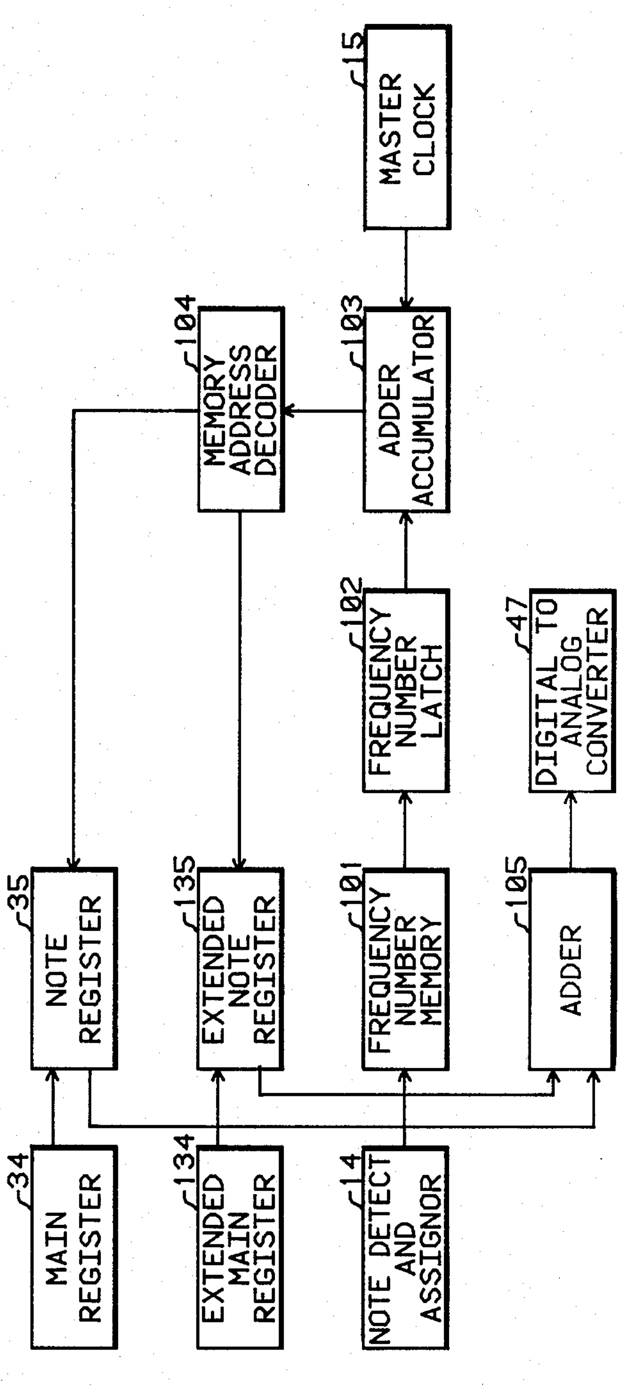
FIG. 2 is a schematic diagram of a tone generator.

FIG. 2 illustrates the details of one of the tone generators which employs the master data set and the extended master data set to produce a musical tone having an extended harmonic range comprising 64 harmonics. This number is equal to the sum of the set of harmonic coefficients stored in the odd harmonic coefficient memory 26 and the set of harmonic coefficients stored in the extended harmonic coefficient memory 126. While only one tone generator is shown explicitly in FIG. 2 it is tacitly assumed that a similar arrangement is embodied in each of the tone generators contained in the system logic block labeled tone generators 100 in FIG. 1.

Following each computation cycle, in the repetitive sequence of computation cycles, a transfer cycle is initiated and executed. During a transfer cycle the master data set stored in the main register 34 is transferred to the note register 35 and the extended master data set stored in the extended main register 134 is transferred to the extended note register 135.

When the note detect and assignor 14 detects that a keyboard switch has been actuated, a corresponding frequency number is read out from the frequency number memory 101. The frequency number memory 101 can be implemented as a read-only addressable memory (ROM) containing data words stored in binary numeric format having values $2^{-(M-N)/12}$ where N has the range of values N=1, 2, . . . , M and M is equal to the number of keyswitches on the musical instrument's keyboard. The frequency numbers represent ratios of frequencies of a generated musical tone with respect to the frequency of the master clock 15. A detailed description of the frequency numbers is contained in U.S. Pat. No. 4,114,496 entitled "Note Frequency Generator For A Polyphonic Tone Synthesizer." This patent is hereby incorporated by reference.

The frequency number read out of the frequency number memory 101 is stored in a frequency number latch 102. In response to timing signals provided by the master clock 15, the frequency number stored in the frequency number latch 102 is repetitively added to contents of an accumulator contained in the adder-accumulator 103.

The six most significant bits of the accumulator content in the adder-accumulator 103 is used by the memory address decoder 104 to sequentially and repetitively read out points of the master data set stored in the note register 35. This sequence of points correspond to points of a first musical waveshape having a fundamental frequency corresponding to the associated actuated keyswitch. This first musical waveshape has a spectrum comprising non-zero values at the odd-harmonic in the range of 1 to 31.

The memory address decoder 104 simultaneously uses the next six most significant bits, not including the most significant bit, to sequentially and repetitively read out data points of the extended master data set stored in the extended note register 135. The net result is that the sequence of points read out from the extended note register 35 correspond to points a second musical waveshape having a fundamental frequency which is one octave higher than the fundamental frequency of the first musical waveshape.

The adder 105 sums the data points for the first and second musical waveshapes read out of the note register 35 and the extended note register 35. The output from the adder 105 is an output musical waveshape whose spectrum contains all the harmonics from 1 through 32 and all the even harmonics from 34 through 64. The output musical tone from the digital-to-analog converter 47 will be a tone having a fundamental frequency corresponding to the actuated keyswitch to which the tone generator has been assigned.

An essential feature of the invention is that the data points read out of the extended note register 135 are phase-locked, or in phase coherence, with the data points read out of the note register 35. If this phase coherence is not implemented, then the resultant musical tone will sound to the listener as if an 8-foot (nominal musical pitch corresponding to an actuated keyswitch) tone exists simultaneously with a second independent tone sounding at an frequency which is an octave higher (4-foot musical pitch). If the phase coherence exists then the resultant musical tone will sound as a single tone having an extended range of harmonic overtones.

The fundamental pitch and tone color of a musical tone is perceived primarily by the relative strength of the first few harmonics. The missing odd harmonics above the 31st harmonic will only very slightly effect the perceived tone because these high harmonic overtones serve primarily to add a "buzz-like" quality to the tone color. This "buzz-like" effect is adequately furnished by the even harmonic sequence of the 32nd through the 64th harmonic.

Figure 3:
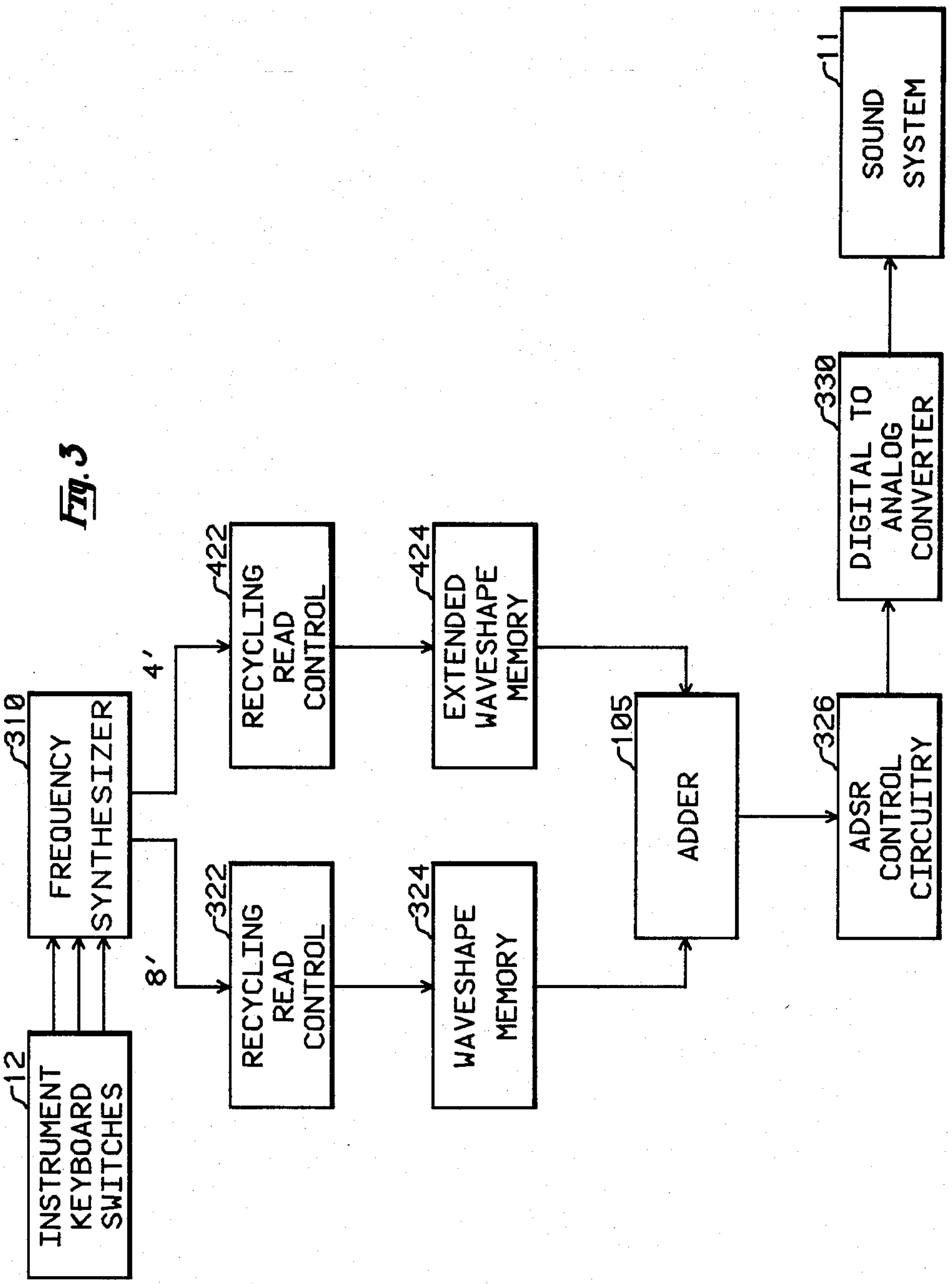
FIG. 3 is a schematic diagram of an alternate embodiment of the invention.

The present invention can also be incorporated into other types of musical tone generators. FIG. 3 shows an alternate embodiment of the invention incorporated into a musical tone generator of the type described in U.S. Pat. No. 3,515,792 entitled "Digital Organ." This patent is hereby incorporated by reference.

The system blocks shown in FIG. 3 having numbers in the 300 series correspond to the same elements shown in FIG. 1 of the referenced patent having the same two last digits.

The frequency synthesizer 310 provides two output addressing timing signals which are phase-locked to each other. One of these is at the 8′, or fundamental, frequency corresponding to an actuated keyboard switch. The 8′ timing signals is used by the recycling read control 322 to sequentially and repetitively read out data points stored in the waveshape memory 324. These data points correspond to a waveshape having a spectrum of only odd harmonics. The even harmonics are missing from the spectrum.

The 4′ timing signals produced by the frequency synthesizer 310 are used by the recycling read control 422 to sequentially and repetitively read out data points stored in the extended waveshape memory 424. These data points correspond to a spectrum containing all harmonics.

The data points read out of the waveshape memory 324 and the extended waveshape memory 424 are summed in the adder 105. The output data points produced by the adder 105 correspond to a waveshape having every harmonic from 1 through 32 and all the even harmonics from 34 through 64 if both the waveshape memory 324 and the extended waveshape memory 424 comprise a memory storing waveshapes have 64 equally spaced points per period.

I claim:

1. In combination with a musical instrument in which a plurality of data words corresponding to the amplitudes of points defining the waveform of a musical tone are computed from a preselected set of harmonic coefficients and are transferred sequentially to a means for conversion into musical waveshapes, apparatus for producing musical tones having an extended number of harmonics comprising;

- a first waveshape memory means,
- a second waveshape memory means,
- a first harmonic coefficient memory means for storing a first set of harmonic coefficients at addressable memory locations,
- a second harmonic coefficient memory means for storing at addressable memory locations a second set of harmonic coefficients corresponding to said extended number of harmonics,
- a harmonic number generating means whereby a sequence of harmonic numbers is generated wherein the elements of said sequence of harmonic numbers are integers increasing in unit increments and said sequence of harmonic numbers is generated having integer values which are modulo the number of harmonic coefficients comprising said second set of harmonic coefficients,
- a first memory addressing means responsive to odd integer values of said sequence of harmonic numbers whereby elements of said first set of harmonic coefficients are read out from said first harmonic coefficient means at memory addresses having an odd numerical value,
- a second memory addressing means responsive to said sequence of harmonic numbers for reading out elements of said second set of harmonic coefficients from said second harmonic coefficient memory means, a means for computing responsive to said elements of said first set of harmonic coefficients read out from said first harmonic coefficient means whereby a first master data set of waveshape data points are generated and stored in said first waveshape memory means, and wherein said means for computing is also responsive to said elements of said second set of harmonic coefficients read out from said second harmonic coefficient means whereby a second master data set of waveshape data points are generated and stored in said second waveshape memory means, and a means for producing musical tones wherein each tone is a combination of data points read out of said first waveshape memory means at a first frequency and data points simultaneously read out at a second frequency from said second waveshape memory means and in phase coherence with the data points read out from said first waveshape memory means whereby said musical tones produced from said combination has an extended number of harmonics equal in number to two times the number of harmonic coefficients comprising said second set of harmonic coefficients.

2. Apparatus according to claim 1 wherein said means for computing comprises;

a clock for providing timing signals, a word counter for counting said timing signals modulo the number of data points comprising said first master data set, a harmonic counter incremented each time said word counter returns to its minimal count state and wherein said harmonic counter counts modulo the number of harmonic coefficients comprising said second set of harmonic coefficients, an adder-accumulator means wherein the count state of said harmonic counter is successively added to the contents of an accumulator in response to said timing signals, a sinusoid table for storing a plurality of trigonometric sinusoid values, an address decoder means responsive to the content of said accumulator in said adder-accumulator means for reading out trigonometric sinusoid values from said sinusoid table, a first computing means responsive to trigonometric values read out of said sinusoid table and responsive to elements of said first set of harmonic coefficients read out of said first harmonic coefficient memory whereby said first master data set of waveshape points are generated, and a second computing means responsive to trigonometric values read out of said sinusoid table and responsive to elements of said second set of harmonic coefficients read out of said second harmonic coefficient memory means whereby said second master data set of waveshape points are generated.

3. Apparatus according to claim 2 wherein said first computing means comprises;

a multiplier means for multiplying the trigonometric values read out from said sinusoid table by elements of said first set of harmonic coefficients, and a means for successively summing the output from said multiplier means with values read out from said first waveshape memory means in response to the count state of said word counter and whereby the summed values are stored in said first waveshape memory means.

4. Apparatus according to claim 2 wherein said second computing means comprises;

a multiplier means for multiplying the trigonometric values read out from said sinusoid table by elements of said second set of harmonic coefficients, and a means for successively summing the output from said multiplier means with values read out from said second waveshape memory means in response to the count state of said word counter and whereby the summed values are stored in said second waveshape memory means.

5. Apparatus according to claim 2 wherein said second memory addressing means comprises;

a memory address decoder responsive to the count state of said harmonic counter whereby a memory address number is generated, and a memory read circuit whereby one of said second set of harmonic coefficients is read out of said second harmonic coefficient memory in response to said memory address number.

6. In combination with a musical instrument in which a plurality of data words corresponding to the amplitudes of points defining the waveform of a musical tone are computed from a preselected set of harmonic coefficients and are transferred sequentially to a means for conversion into musical waveshapes, apparatus for producing musical tones having an extended number of harmonics comprising;

a first waveshape memory means, a second waveshape memory means, a first harmonic coefficient memory means for storing a first set of harmonic coefficients at addressable memory locations, a second harmonic coefficient memory means for storing at addressable memory locations a second set of harmonic coefficients corresponding to said extended number of harmonics, a clock for providing timing signals, a word counter for counting said timing signals modulo the number of said plurality of data words comprising a period of said waveform of a musical tone, a harmonic counter incremented each time said word counter returns to its minimal count state and wherein said harmonic counter counts modulo the number of harmonic coefficients comprising said second set of harmonic coefficients, a memory address decoder responsive to the count state of said harmonic counter whereby a memory address number is generated, a memory read circuit whereby one of said first set of harmonic coefficients is read out of said first harmonic coefficient memory means in response to said memory address number if said memory address number has an odd numerical value and whereby a zero value is provided to said means for computing if said memory address number has an even numerical value, a memory addressing means for reading out elements of said second set of harmonic coefficients from said second harmonic coefficient memory means, a means for computing responsive to said elements of said harmonic coefficients provided by said memory read circuit whereby a first master data set of waveshape data points are generated and stored in said first waveshape memory means, and wherein said means for computing is also responsive to said elements of said second set of harmonic coefficients read out from said second harmonic coefficient means whereby a second master data set of waveshape data points are generated and stored in said second waveshape memory means, and a means for producing musical tones responsive to data points read out of said first waveshape memory means and responsive to data points read out in phase coherence from said second waveshape memory means whereby said musical tones have an extended number of harmonics equal in number to two times the number of harmonic coefficients comprising said second set of harmonic coefficients.

7. Apparatus according to claim 1 wherein said means for producing musical tones comprises;

a third waveshape memory means, a fourth waveshape memory means, and a data transfer means whereby the first master data set stored in said first waveshape memory means is transferred to said third waveshape memory means and whereby the second master data set stored in said second waveshape memory means is transferred to said fourth waveshape memory means.

8. Apparatus according to claim 7 wherein said means for producing musical tones further comprises;

a first reading means for successively and repetitively reading out said first master data set values stored in said third waveshape memory at a memory address advance rate corresponding to the frequency of said musical tone, a second reading means for successively and repetitively reading out said second master data set values stored in said fourth waveshape memory at a memory address advance rate corresponding to twice said frequency of said musical tone and whereby said second reading means has a constant phase relation with respect to said first reading means, a combination means for combining the master data set values read out of said third waveshape memory with the second master data set values read out of said fourth waveshape memory to form a combination set of waveshape data points, and conversion means for producing said musical tone in response to said combination of waveshape data points.

9. In combination with a musical instrument in which a plurality of points defining the waveform of a musical tone are computed from a preselected set of harmonic coefficients, and are transferred sequentially to a means for conversion into musical waveshapes, apparatus for producing a musical tone having an extended number of harmonics comprising;

a first waveshape memory means for storing a set of first data points defining the waveform of a first musical tone, a second waveshape memory for storing a set of second data points defining the waveform of a second musical tone, a first harmonic coefficient memory means for storing a first set of harmonic coefficients at addressable memory locations, a second harmonic coefficient memory means for storing at addressable memory locations a second set of harmonic coefficients corresponding to said extended number of harmonics, a memory addressing means for reading out the first set of harmonic coefficients from said first harmonic coefficient memory means and for reading out the second set of harmonic coefficients from said second harmonic coefficient memory means, a means for computing whereby in response to said read out first set of harmonic coefficients said set of first data points defining the waveform of a first musical tone are computed and stored in said first waveshape memory means, and whereby in response to said read out second set of harmonic coefficients said set of second data points defining the waveform of a second musical tone are computed and stored in said second waveshape memory means, a first reading means for successively and repetitively reading out said set of first data points stored in said first waveshape memory means at a memory address advance rate corresponding to the frequency of said musical tone, a second reading means for successively and repetitively reading out said set of second data points stored in said second waveshape memory means at a memory advance rate corresponding to twice said frequency of said musical tone and whereby said second reading means has a constant phase relation with respect to said first reading means, a combination means for combining the first data points read out of said first waveshape memory with the second data points read out of said second waveshape memory to form a sequence of combination data points, and conversion means for producing said musical tone in response to said sequence of combination data points.

* * * * *